(12) United States Patent
Freeborg et al.

(10) Patent No.: US 11,946,253 B2
(45) Date of Patent: Apr. 2, 2024

(54) IMPACT RESISTANT ROOFING SHINGLE AND METHOD FOR MAKING SAME

(71) Applicant: TAMKO Building Products LLC, Galena, KS (US)

(72) Inventors: Christopher Freeborg, Joplin, MO (US); James Gregory Powell, Reeds, MO (US); Jonathan Marta, Joplin, MO (US)

(73) Assignee: TAMKO BUILDING PRODUCTS LLC, Galena, KS (US)

( * ) Notice: Subject to any disclaimer, the term of this patent is extended or adjusted under 35 U.S.C. 154(b) by 359 days.

(21) Appl. No.: 16/803,554

(22) Filed: Feb. 27, 2020

(65) Prior Publication Data

US 2020/0277789 A1    Sep. 3, 2020

Related U.S. Application Data

(60) Provisional application No. 62/812,854, filed on Mar. 1, 2019.

(51) Int. Cl.
| | |
|---|---|
| *E04D 1/28* | (2006.01) |
| *E04D 1/00* | (2006.01) |
| *E04D 1/26* | (2006.01) |
| *B32B 5/12* | (2006.01) |

(Continued)

(52) U.S. Cl.
CPC ............... *E04D 1/28* (2013.01); *E04D 1/26* (2013.01); *E04D 1/2963* (2019.08); *B32B 5/12* (2013.01); *B32B 5/30* (2013.01); *B32B 27/08* (2013.01); *B32B 2419/06* (2013.01)

(58) Field of Classification Search
CPC   E04D 1/28; E04D 1/26; E04D 1/2963; E04D 1/20; B32B 5/12; B32B 5/30; B32B 27/08; B32B 2419/06
See application file for complete search history.

(56) References Cited

U.S. PATENT DOCUMENTS

| | | |
|---|---|---|
| 1,456,224 A | 5/1923 | Currier |
| 1,975,584 A | 10/1934 | Leonard, Jr. |
| 1,975,986 A | 10/1934 | Straub |

(Continued)

FOREIGN PATENT DOCUMENTS

| | | |
|---|---|---|
| CA | 2455652 C | 9/2007 |
| CA | 2455026 C | 10/2010 |

(Continued)

*Primary Examiner* — Adriana Figueroa
(74) *Attorney, Agent, or Firm* — Husch Blackwell LLP

(57) ABSTRACT

An impact resistant roofing shingle comprising an upper shingle layer; a lower shingle layer laminated to said upper shingle layer underneath said tab portion of said upper shingle layer; wherein each of the upper shingle layer and the lower shingle layer comprise a mat, an upper asphalt coating layer applied to an exposed side of the mat, a lower asphalt coating layer applied to an unexposed side of the mat, a granular coating applied to the upper asphalt coating layer opposite the mat, and a fabric reinforcing layer applied to the lower asphalt coating layer opposite the mat. In one embodiment, the roofing shingle may also include the fabric reinforcing layer covering the entire area of each mat. The roofing shingle may have a recessed area of the exposed side of the overlay layer that aligns with the overlap of the overlay and underlay layers.

17 Claims, 4 Drawing Sheets

(51) Int. Cl.
  *B32B 5/30* (2006.01)
  *B32B 27/08* (2006.01)

(56) References Cited

U.S. PATENT DOCUMENTS

| | | | |
|---|---|---|---|
| 2,125,694 A | 8/1938 | Sattig | |
| 2,161,440 A | 6/1939 | Venrick | |
| 2,234,446 A | 3/1941 | Theophilus | |
| 2,400,746 A | 5/1946 | Fassiotto et al. | |
| 2,935,768 A | 5/1960 | Roupe | |
| 3,077,265 A | 2/1963 | Thamme | |
| 3,332,830 A * | 7/1967 | Tomlinson | D21J 1/00 428/190 |
| 3,921,358 A * | 11/1975 | Bettoli | E04D 1/26 52/557 |
| 4,033,802 A | 7/1977 | Culpepper, Jr. et al. | |
| 4,081,939 A | 4/1978 | Culpepper, Jr. et al. | |
| 4,102,107 A | 7/1978 | Barker et al. | |
| 4,140,825 A | 2/1979 | Koschorrek | |
| 4,212,692 A * | 7/1980 | Rasen | D04H 3/16 156/181 |
| 4,459,788 A | 7/1984 | Bockwinkel et al. | |
| 4,477,972 A | 10/1984 | Testa | |
| 4,546,589 A | 10/1985 | Seaman | |
| 4,603,078 A | 7/1986 | Zanker et al. | |
| 4,606,164 A | 8/1986 | Mendez | |
| 4,651,492 A | 3/1987 | Mendez | |
| 4,655,009 A | 4/1987 | Degraan | |
| 4,668,315 A | 5/1987 | Brady et al. | |
| 4,717,614 A * | 1/1988 | Bondoc | E04D 1/26 52/553 |
| 4,738,068 A | 4/1988 | Mendez | |
| RE32,710 E | 7/1988 | Seaman | |
| 4,783,944 A | 11/1988 | Mendez | |
| 4,795,661 A * | 1/1989 | Bondoc | E04D 1/20 427/187 |
| 4,848,057 A | 7/1989 | MacDonald et al. | |
| 5,195,290 A | 3/1993 | Hulett | |
| 5,322,724 A | 6/1994 | Levens | |
| 5,504,136 A | 4/1996 | Davis et al. | |
| 5,545,685 A | 8/1996 | Davis et al. | |
| 5,612,141 A | 3/1997 | Davis et al. | |
| 5,616,395 A | 4/1997 | Baravian et al. | |
| 5,822,943 A | 10/1998 | Frankoski et al. | |
| 5,859,114 A | 1/1999 | Davis et al. | |
| 6,000,185 A | 12/1999 | Beck et al. | |
| 6,010,589 A | 1/2000 | Stahl et al. | |
| 6,038,826 A | 3/2000 | Stahl et al. | |
| 6,044,608 A | 4/2000 | Stahl et al. | |
| 6,092,345 A | 7/2000 | Kalkanoglu et al. | |
| 6,145,265 A | 11/2000 | Malarkey et al. | |
| 6,146,728 A | 11/2000 | Bay | |
| 6,178,703 B1 | 1/2001 | Noone et al. | |
| 6,228,785 B1* | 5/2001 | Miller | E04D 1/20 442/104 |
| 6,341,462 B2 | 1/2002 | Kiik et al. | |
| 6,378,259 B1 | 4/2002 | Carlson | |
| 6,397,546 B1 | 6/2002 | Malarkey et al. | |
| 6,426,309 B1* | 7/2002 | Miller | E04D 5/12 442/364 |
| 6,436,510 B1 | 8/2002 | Heidel et al. | |
| 6,500,560 B1 | 12/2002 | Kiik et al. | |
| 6,586,353 B1 | 7/2003 | Kiik et al. | |
| 6,673,432 B2 | 1/2004 | Kiik et al. | |
| 6,708,456 B2 | 3/2004 | Kiik et al. | |
| 6,709,994 B2 | 3/2004 | Miller et al. | |
| 6,737,369 B2 | 5/2004 | Peng et al. | |
| 6,758,019 B2 | 7/2004 | Kalkanoglu et al. | |
| 6,804,919 B2 | 10/2004 | Railkar | |
| 6,851,240 B2 | 2/2005 | Peng et al. | |
| 6,858,550 B2 | 2/2005 | Ahluwalia | |
| 6,872,440 B1 | 3/2005 | Kiik et al. | |
| 6,936,329 B2 | 8/2005 | Kiik et al. | |
| 6,990,779 B2 | 1/2006 | Kiik et al. | |
| 7,048,990 B2 | 5/2006 | Koschitzky | |
| 7,082,724 B2 | 8/2006 | Railkar et al. | |
| 7,118,794 B2 | 10/2006 | Kalkanoglu et al. | |
| 7,281,358 B2 | 10/2007 | Floyd | |
| 7,442,658 B2 | 10/2008 | Rodrigues et al. | |
| 7,443,658 B2 | 10/2008 | Nagata et al. | |
| 7,521,385 B2 | 4/2009 | Ahluwalia | |
| 7,537,820 B2 | 5/2009 | Kalkanoglu et al. | |
| 7,563,733 B2 | 7/2009 | Ahluwalia et al. | |
| 7,578,108 B2 | 8/2009 | Swanson | |
| 7,685,785 B2 | 3/2010 | Johnson | |
| 7,716,894 B2 | 5/2010 | Jolitz | |
| 7,718,558 B2 | 5/2010 | Galvin | |
| 7,781,046 B2 | 8/2010 | Kalkanoglu et al. | |
| 7,836,654 B2 | 11/2010 | Belt et al. | |
| 7,851,051 B2 | 12/2010 | DeJarnette et al. | |
| 7,981,819 B2 | 7/2011 | Ahluwalia | |
| 8,017,531 B2 | 9/2011 | Ahluwalia et al. | |
| 8,030,229 B2 | 10/2011 | Ahluwalia et al. | |
| 8,099,923 B2 | 1/2012 | Jolitz et al. | |
| 8,136,322 B2 | 3/2012 | Shadwell et al. | |
| 8,156,704 B2 | 4/2012 | Belt et al. | |
| 8,173,243 B2 | 5/2012 | Kalkanoglu et al. | |
| 8,181,413 B2 | 5/2012 | Belt et al. | |
| 8,226,790 B2 | 7/2012 | Rodriques et al. | |
| 8,231,443 B1 | 7/2012 | Tomcak et al. | |
| 8,240,102 B2 | 8/2012 | Belt et al. | |
| 8,297,020 B1 | 10/2012 | Swanson | |
| 8,383,228 B2 | 2/2013 | Kalkanoglu et al. | |
| 8,409,689 B2 | 4/2013 | Kalkanoglu et al. | |
| 8,430,983 B2 | 4/2013 | Vermilion et al. | |
| 8,440,983 B2 | 5/2013 | Yanagita et al. | |
| 8,453,410 B2 | 6/2013 | Kalkanoglu et al. | |
| 8,557,366 B2 | 10/2013 | Harrington, Jr. et al. | |
| 8,592,025 B2 | 11/2013 | Kalkanoglu et al. | |
| 8,607,521 B2* | 12/2013 | Belt | E04D 1/28 52/557 |
| 8,615,968 B2 | 12/2013 | Kalkanoglu et al. | |
| 8,623,164 B2 | 1/2014 | Belt et al. | |
| 8,752,351 B2 | 6/2014 | Belt et al. | |
| 8,765,251 B2 | 7/2014 | Strait | |
| 8,833,037 B2 | 9/2014 | French et al. | |
| 8,852,680 B2 | 10/2014 | Shiao et al. | |
| 8,925,272 B1* | 1/2015 | Amatruda | E04D 1/2963 52/557 |
| 8,950,161 B2 | 2/2015 | Kalkanoglu et al. | |
| 8,959,875 B2 | 2/2015 | Kalkanoglu et al. | |
| 8,959,876 B2 | 2/2015 | Kalkanoglu et al. | |
| 8,984,835 B2 | 3/2015 | Kalkanoglu et al. | |
| 8,991,130 B2 | 3/2015 | Belt et al. | |
| 9,010,058 B2* | 4/2015 | DeJarnette | E04D 1/28 52/560 |
| 9,017,791 B2 | 4/2015 | Grubka et al. | |
| 9,121,178 B2 | 9/2015 | Belt et al. | |
| 9,163,410 B2 | 10/2015 | French et al. | |
| 9,169,645 B1 | 10/2015 | Kalkanoglu et al. | |
| 9,353,526 B2 | 5/2016 | Kalkanoglu et al. | |
| RE46,177 E * | 10/2016 | Vermilion | B32B 37/12 |
| 9,605,434 B2 | 3/2017 | Belt et al. | |
| 9,624,670 B2 | 4/2017 | Belt et al. | |
| 9,657,478 B2 | 5/2017 | Belt et al. | |
| 9,657,479 B2 | 5/2017 | Kalkanoglu et al. | |
| 9,834,935 B2* | 12/2017 | Loftus | D06N 5/006 |
| 10,060,132 B2 | 8/2018 | Beerer et al. | |
| 10,189,656 B2 | 1/2019 | Belt et al. | |
| 10,308,448 B2 | 6/2019 | Belt et al. | |
| 10,315,863 B2 | 6/2019 | Belt et al. | |
| 10,322,889 B2 | 6/2019 | Belt et al. | |
| 10,357,946 B2 | 7/2019 | Leatherman et al. | |
| 10,428,524 B2* | 10/2019 | Humphreys | B32B 3/085 |
| 2003/0165667 A1 | 9/2003 | Decker et al. | |
| 2004/0014385 A1 | 1/2004 | Greaves, Jr. et al. | |
| 2004/0083673 A1* | 5/2004 | Kalkanoglu | E04D 1/26 52/748.11 |
| 2004/0182032 A1 | 9/2004 | Koschitzky | |
| 2004/0221536 A1 | 11/2004 | Kalkanoglu et al. | |
| 2004/0258883 A1* | 12/2004 | Weaver | E04D 1/26 427/180 |
| 2005/0204675 A1 | 9/2005 | Snyder et al. | |

(56) References Cited

U.S. PATENT DOCUMENTS

| | | | |
|---|---|---|---|
| 2006/0123727 A1* | 6/2006 | Akins | E04D 1/26 52/409 |
| 2006/0137262 A1 | 6/2006 | Crowder-Moore et al. | |
| 2006/0179767 A1* | 8/2006 | Miller | B32B 5/30 52/555 |
| 2007/0011978 A1* | 1/2007 | Kalkanoglu | C09D 195/00 52/518 |
| 2007/0039274 A1* | 2/2007 | Harrington | E04D 1/26 52/518 |
| 2007/0042158 A1 | 2/2007 | Belt et al. | |
| 2007/0266665 A1 | 11/2007 | Todd et al. | |
| 2008/0134612 A1 | 6/2008 | Koschitzky | |
| 2008/0248241 A1 | 10/2008 | Kalkanoglu et al. | |
| 2009/0049765 A1 | 2/2009 | Grant | |
| 2009/0193745 A1 | 8/2009 | Kalkanoglu et al. | |
| 2009/0282767 A1 | 11/2009 | Grubka | |
| 2009/0293404 A1 | 12/2009 | Belt et al. | |
| 2010/0005745 A1 | 1/2010 | Harrington, Jr. | |
| 2010/0098912 A1 | 4/2010 | Snyder et al. | |
| 2010/0105267 A1 | 4/2010 | Scheerlinck et al. | |
| 2010/0130080 A1 | 5/2010 | Coninx et al. | |
| 2010/0196647 A1* | 8/2010 | Bryson | E04D 1/20 52/309.3 |
| 2010/0310825 A1 | 12/2010 | Kalkanoglu et al. | |
| 2010/0330263 A1 | 12/2010 | Teng et al. | |
| 2011/0016812 A1 | 1/2011 | Belt et al. | |
| 2011/0072752 A1* | 3/2011 | Aschenbeck | B32B 11/02 53/446 |
| 2011/0139366 A1 | 6/2011 | Belt et al. | |
| 2011/0146185 A1 | 6/2011 | Belt et al. | |
| 2011/0151170 A1 | 6/2011 | Grubka et al. | |
| 2011/0197534 A1 | 8/2011 | Belt et al. | |
| 2011/0232220 A1 | 9/2011 | Belt et al. | |
| 2011/0283646 A1* | 11/2011 | Vermilion | E04D 1/26 52/539 |
| 2012/0047838 A1 | 3/2012 | Kalkanoglu et al. | |
| 2012/0210666 A1 | 8/2012 | Kalkanoglu et al. | |
| 2012/0258282 A1* | 10/2012 | Hammond | C04B 26/26 428/143 |
| 2013/0025224 A1 | 1/2013 | Vermilion et al. | |
| 2013/0065020 A1* | 3/2013 | Loftus | E04D 5/12 428/143 |
| 2013/0180196 A1 | 7/2013 | Kalkanoglu et al. | |
| 2013/0219819 A1 | 8/2013 | Kalkanoglu et al. | |
| 2014/0053492 A1 | 2/2014 | Kalkanoglu et al. | |
| 2014/0102030 A1 | 4/2014 | Belt et al. | |
| 2014/0102031 A1 | 4/2014 | Belt et al. | |
| 2014/0150365 A1 | 6/2014 | Belt et al. | |
| 2014/0245690 A1* | 9/2014 | Stahl | E04D 1/26 52/748.1 |
| 2014/0250816 A1 | 9/2014 | Kalkanoglu et al. | |
| 2014/0290170 A1 | 10/2014 | Kalkanoglu et al. | |
| 2014/0322494 A1 | 10/2014 | Belt et al. | |
| 2014/0325929 A1 | 11/2014 | Vermilion et al. | |
| 2015/0292208 A1 | 10/2015 | Kalkanoglu et al. | |
| 2016/0017607 A1 | 1/2016 | Kalkanoglu et al. | |
| 2016/0090742 A1 | 3/2016 | Belt et al. | |
| 2017/0158440 A1 | 6/2017 | Belt et al. | |
| 2017/0284100 A1 | 10/2017 | Jenkins et al. | |
| 2018/0051465 A1* | 2/2018 | Grubka | E04D 1/28 |
| 2018/0155931 A1 | 6/2018 | Loftus et al. | |
| 2018/0187419 A1* | 7/2018 | Lai | B32B 27/40 |
| 2018/0245349 A1 | 8/2018 | Shepherd | |
| 2018/0320379 A1 | 11/2018 | Weeks et al. | |
| 2019/0360209 A1 | 11/2019 | Grubka et al. | |
| 2020/0040582 A1 | 2/2020 | Boss et al. | |

FOREIGN PATENT DOCUMENTS

| | | |
|---|---|---|
| CA | 2783248 C | 6/2019 |
| WO | 2006080907 A1 | 8/2006 |
| WO | 2013040180 A1 | 3/2013 |

* cited by examiner

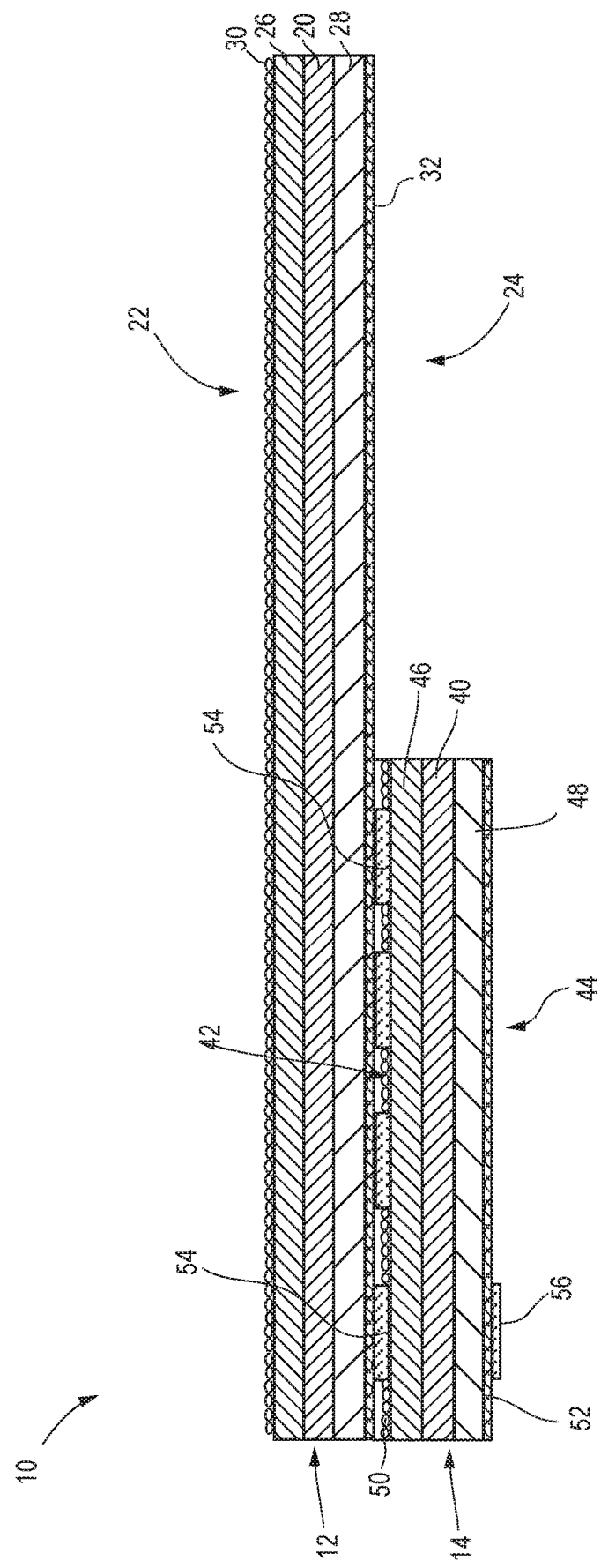

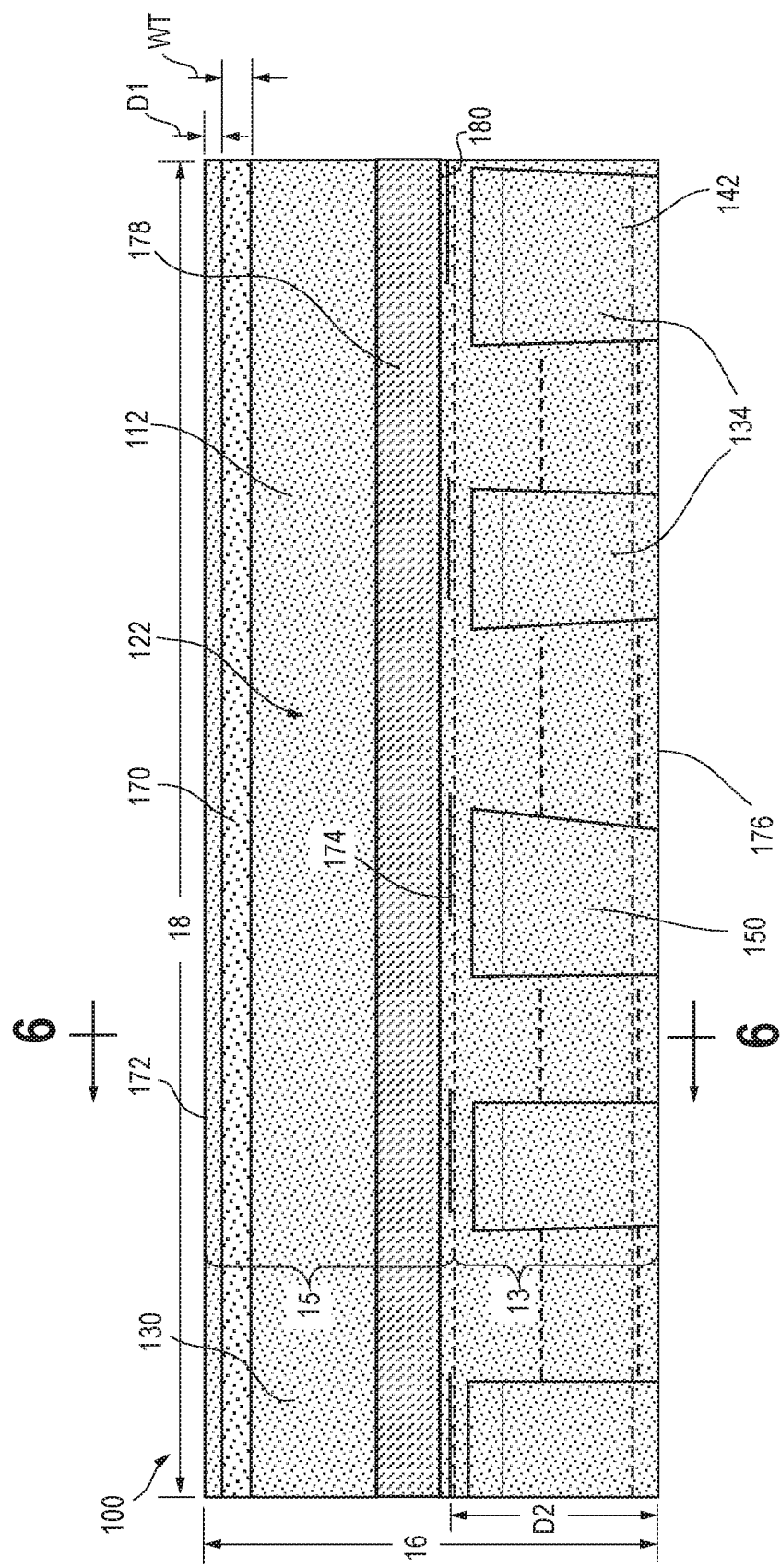

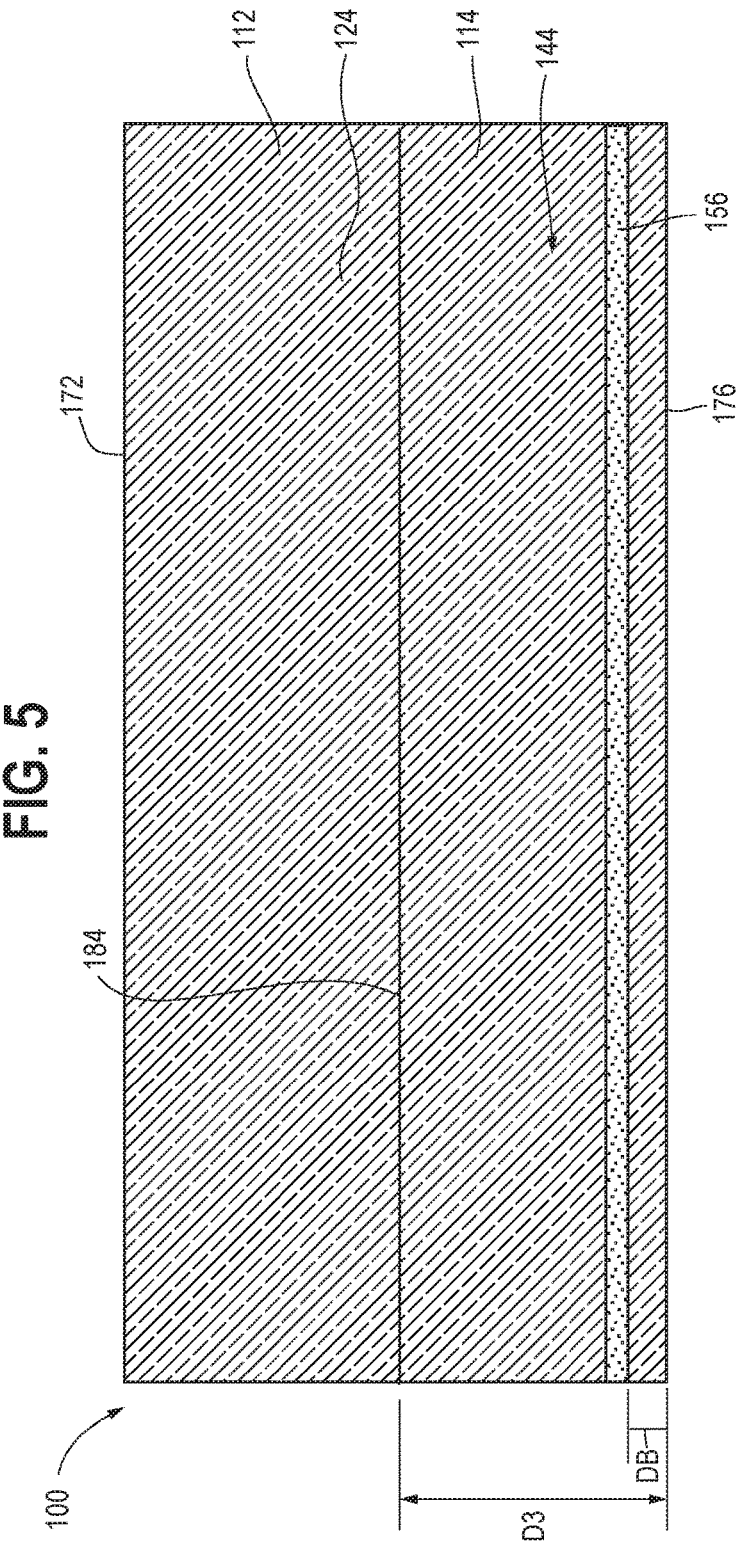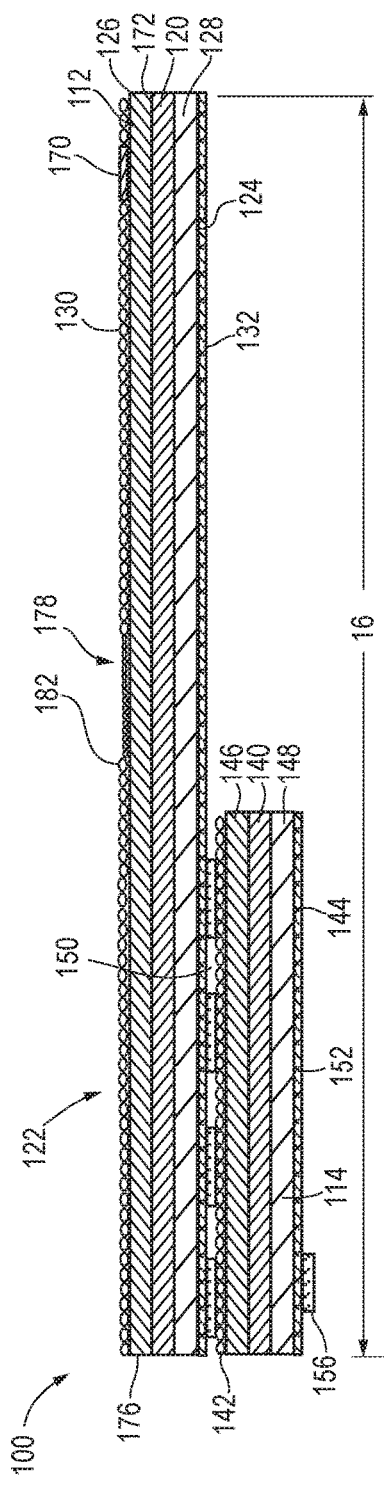

IMPACT RESISTANT ROOFING SHINGLE AND METHOD FOR MAKING SAME

CROSS-REFERENCE TO RELATED APPLICATION

This application claims priority to U.S. Provisional Patent Application No. 62/812,854, filed Mar. 1, 2019, entitled "Impact Resistant Roofing Shingle and Method for Making Same" owned by TAMKO Building Products LLC, currently pending, the entire disclosure of which is incorporated herein by reference.

FIELD OF THE INVENTION

This present invention relates to an impact resistant asphalt roofing shingle and method for making the same. The impact resistance is at least partially provided through a polymer-based reinforcing fabric or film applied to unexposed side of the shingle layers and wherein such reinforcing fabric or film replaces the fine aggregate that is applied to conventional asphalt shingles.

BACKGROUND OF THE INVENTION

Hail storms costs homeowners and insurance companies a substantial amount of money each year. There have been many attempts to develop impact resistant shingles by many shingle manufacturers. Various approaches have been introduced, but the existing designs have varying degrees of success. As such, there is a need in the art for impact resistant shingles that are lightweight, effective, and that maintain the impact resistant nature throughout the shingle's design life while also improving manufacturing conditions.

SUMMARY OF THE INVENTION

The present invention is directed toward an impact resistant roofing shingle that includes an upper shingle layer having a tab portion and a headlap portion. The impact resistant roofing shingle may also include a lower shingle layer laminated to the upper shingle layer underneath the tab portion of the upper shingle layer. In one embodiment, each of the upper shingle layer and the lower shingle layer comprise a mat, an upper asphalt coating layer applied to an exposed side of the mat, a lower asphalt coating layer applied to an unexposed side of the mat, a granular coating applied to the upper asphalt coating layer opposite the mat, and a fabric reinforcing layer applied to over the lower asphalt coating layer opposite the mat.

In another embodiment, the impact resistant roofing shingle may similarly include the upper shingle layer having a tab portion and a headlap portion, wherein the upper shingle layer comprises a first mat, a first upper asphalt coating layer applied to an exposed side of the first mat, a first lower asphalt coating layer applied to an unexposed side of the first mat, a first granular coating applied to the first upper asphalt coating layer opposite the first mat, and a first fabric reinforcing layer adhered to the lower asphalt coating layer opposite the first mat, wherein the first fabric reinforcing layer covers the entire area of the unexposed side of the first mat.

The impact resistant shingle may further similarly include the lower shingle layer laminated to the upper shingle layer underneath the tab portion of the upper shingle layer, wherein the lower shingle layer comprises a second mat, a second upper asphalt coating layer applied to an exposed side of the second mat, a second lower asphalt coating layer applied to an unexposed side of the second mat, a second granular coating applied to the second upper asphalt coating layer opposite the second mat, and a second fabric reinforcing layer adhered to the lower asphalt coating layer opposite the second mat, wherein the second fabric reinforcing layer covers the entire area of the unexposed side of the second mat. Further, the upper shingle layer may include a first width defined between a bottom of the roofing shingle and a top of the roofing shingle, and the lower shingle layer may have a second width defined between the bottom of the roofing shingle and a top edge of the lower shingle layer, wherein the second width may be less than the first width of the overlay layer.

The impact resistant roofing shingle may also include an embodiment wherein the fabric reinforcing layer of each of the overlay layer and the underlay layer covers the entirety of the unexposed side of the mat of each of the overlay layer and the underlay layer.

The impact resistant roofing shingle may also include an embodiment that further includes a nail line visible on a visible surface of the exposed side of the roofing shingle. The nail line may be located a first distance from a bottom of the roofing shingle and a top edge of the underlay layer may be located a second distance from the bottom of the roofing shingle. In one embodiment, the first distance is greater than the second distance.

The present impact resistant roofing shingle may include an embodiment wherein the fabric reinforcing layer is a polyethylene terephthalate (PET) fabric, and/or has a thickness between about 8 and 24 mils, and/or has a weight between 55 and 95 grams per square meter.

Further, the fabric reinforcing layer of the impact resistant roofing shingle may be comprised of a plurality of strands of material that are purposely randomly arranged and then are point bonded to fuse the strands together at a plurality of locations.

Another possible feature of the present impact resistant roofing shingle is a recessed area of the exposed side of the upper shingle layer, wherein the recessed area is disposed along a width of the roofing shingle such that the recessed area aligns with the overlap of the upper shingle layer and the lower shingle layer when a plurality of the roofing shingle are stacked on top of each other in a bundle for transport and/or storage. This recessed area, or headlap displacement zone, may help reduce a hump created near the center of a bundle of shingles due to the aggregation of the overlap between the upper and lower shingle layers when the shingles are in a stacked relationship. This feature helps reduce visible deformations and also increases the functional performance as stress points or deformations in the shingle due to the hump may damage the shingle.

In addition, in one embodiment, the fabric reinforcing layer may be adhered to the shingle using the stickiness of the lower asphalt coating layer applied to the respective mat.

Other aspects and advantages of the present invention will be apparent from the following detailed description of the preferred embodiments and the accompanying drawing figures.

BRIEF DESCRIPTION OF THE SEVERAL VIEWS OF THE DRAWING

The accompanying drawings form a part of the specification and are to be read in conjunction therewith, in which like reference numerals are employed to indicate like or similar parts in the various views, and wherein:

FIG. 3 is a schematic section view of the impact resistant shingle of FIG. 1 cut along the line 3-3;

FIG. 4 is a front view of one embodiment of an impact resistant shingle in accordance with the present disclosure;

FIG. 5 is a rear view of the impact resistant shingle of FIG. 4; and

FIG. 6 is a schematic section view of the impact resistant shingle of FIG. 4 cut along the line 6-6.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

The present disclosure incorporates the disclosures of U.S. Pat. No. 5,822,943 and U.S. patent application Ser. No. 14/622,847 (now U.S. Pat. No. 10,428,524) by reference in their entirety.

The present invention relates to an impact resistant laminated asphalt roofing shingle which may be applied to residential or commercial structures. The present impact resistant laminated asphalt roofing shingle generally eliminates the fine aggregate applied to the unexposed side of the shingle mat and replaces it with a reinforcing fabric layer that is applied to the entire unexposed side of both the overlay layer and the underlay layer. The proposed construction provides improved impact resistance and particular advantages by simplifying the tasks of complying with limits on employee exposure to fine aggregate and dust particles, and emissions of same into the environment by eliminating the use of the abrasive fine aggregate which is a solution preferred over the way exposures and emissions are usually managed with engineering controls and personal protective equipment. Also, elimination of the fine aggregate and dust particles reduces the wear on manufacturing machinery and makes it easier to clean the workplace.

Figure 1:
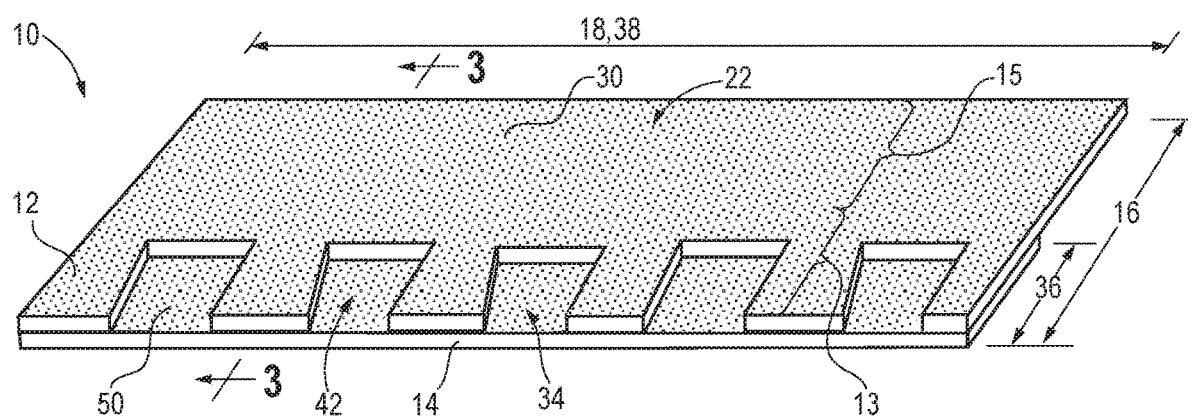
FIG. 1 is a perspective top view of one embodiment of an impact resistant shingle in accordance with the teachings of the present disclosure.

FIG. 1 is a top perspective schematic top view of the present impact resistant shingle 10 being a laminated shingle that includes a laminated shingle upper (overlay) layer 12 and a lower (underlay) layer 14. Overlay layer 12 of impact resistant shingle 10 includes an overlay width 16 and an overlay length 18, wherein width 16 and length 18 comprise an area of the shingle 10. Overlay layer 12 also generally includes an exposed side 22 and plurality of architectural cut-outs 34 when combined with surface granules 30 to provide an architectural appearance and texture of the shingle 10.

FIG. 1 also illustrates underlay layer 14 having width 36 and a length 38, wherein width 36 of the underlay layer 14 is less than the width 16 of the overlay layer. Underlay layer 14 also includes an exposed side 42 having granules 50 that are visible through the architectural cut-outs 34. FIG. 1 also shows shingle 10 having a tab portion 13 and a headlap portion 15. When installed, the tab portion 13 is visible and the headlap portion 15 is generally covered by the tab portion 13 of an overlapping shingle.

Figure 2:
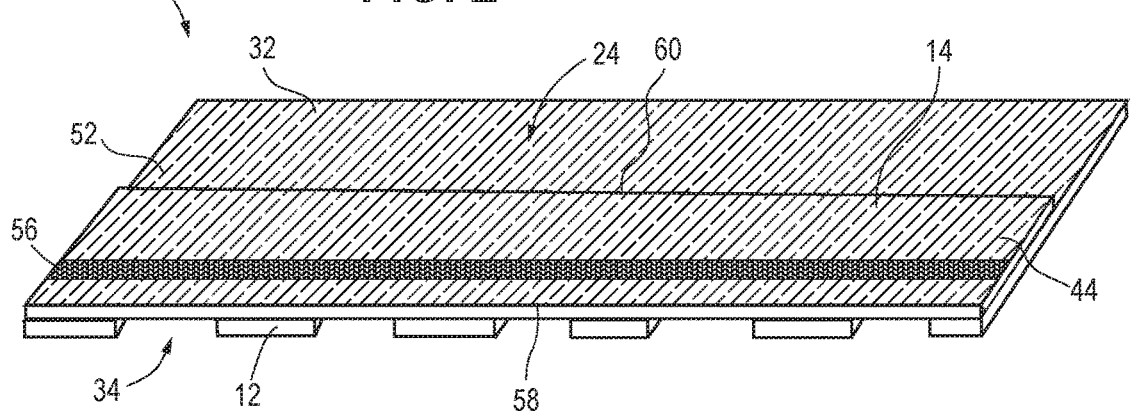
FIG. 2 is a perspective bottom view of one embodiment of an impact resistant shingle in accordance with the teachings of the present disclosure.

FIG. 2 is a bottom perspective view of shingle 10 showing underlay layer 14 having an unexposed side 44 and overlay layer 12 having an unexposed side 24. FIG. 2 also shows overlay layer 12 having a fabric reinforcing layer 32 as its outermost layer and underlay layer 14 a fabric reinforcing layer 52 as its outermost layer. FIG. 2 also illustrates one embodiment including a sealant bead 56 that is disposed near a bottom edge 58 of shingle 10. As shown in FIG. 2, a nailing zone for the shingle 10 may be located in the overlapping portion, where the overlay layer 12 over laps the top edge 60 of the underlay layer 14.

FIG. 3 is a sectional view of the shingle 10 of FIG. 1 cut along the line 3-3. FIG. 3 illustrates the layered construction of shingle 10. As shown, overlay layer 12 includes a base mat 20 and an exposed side 22 and an unexposed side 24. Overlay layer 12 also includes a top asphalt coating layer 26 applied to the exposed side 22 of base mat 20 and a bottom asphalt coating layer 28 applied to the unexposed side 24 of base mat 20. Overlay layer 12 includes a layer of granules 30 that comprises a wearing surface on exposed side 22 and a reinforcing fabric layer 32 that covers bottom asphalt layer 28 and extends over the entire area of underlay layer 14. In one embodiment, the reinforcing layer has a substantially constant or uniform thickness and because the reinforcing layer 32 is applied to the entire area of both the overlay layer, the construction of shingle 10 results in an uniform thickness of both the overlay layer 12 and the reinforcing layer 32.

Similarly, underlay layer 14 includes a base mat 40 having an exposed side 42 and an unexposed side 44. Underlay layer 14 also includes a top asphalt coating layer 46 applied to the exposed side 42 of base mat 40 and a bottom asphalt coating layer 48 applied to the unexposed side 44 of base mat 40. Underlay layer 14 also includes a layer of granules 50 applied to the top asphalt layer 46 opposite the mat 40. The layer of granules 50 comprise a wearing surface on exposed side 42. Further, a reinforcing fabric layer 52 is applied to bottom asphalt coating layer 48 opposite mat 40, wherein the reinforcing fabric layer 52 covers the entire area of underlay layer 14. When manufacturing the present shingle, in one embodiment, sand, talc, or any other fine aggregate material is not applied to the bottom asphalt coating layer 48. In its place, the reinforcing fabric layer 52 may be adhered to the bottom asphalt coating layer 48 directly or using an adhesive, where such adhesive may be asphalt based.

FIG. 3 also illustrates that a laminating adhesive 54 may be used to adhere the overlay layer 12 and the underlay layer 14. As can be seen in FIG. 3, the present shingle 10 includes an embodiment wherein there are at least four material layers under the "dragon tooth" which is the portion remaining after the cutout 34. In one embodiment, the four layers include the top asphalt layer 46, the mat 40, the bottom asphalt layer 48 and the reinforcing layer 52. This construction may result in a more resilient and longer-lasting shingle.

In some embodiments, even though a heavier weight reinforcing fabric may be used, other design considerations may result in a lighter shingle compared to other impact resistant shingles. In addition to limiting the weight of the resultant impact resistant shingle as compared to other known impact resistant shingles, the use of the reinforcing fabric layer 32 and 52 on the unexposed side 24, 44 of the shingle may provide the advantages of avoiding employee exposure to the fine particulates of the fine granular material and reduces the maintenance on machines while at the same time preventing sticking of the shingle sheet as it runs through the manufacturing line. The application of the reinforcing fabric layer 32, 52 to the unexposed side 24, 44 also makes it easier for a manufacturer to comply with environmental and safety requirements by eliminating the use of the fine aggregates and granular materials.

Base mat 20, 40 may be any base mat currently used in the construction of asphalt shingles including, fiberglass, polyester, or organic felt mats, or any other mats now known or hereafter developed for use as an asphalt shingle substrate. Base mat 20, 40 may be saturated with asphaltic material prior to being coated with the top layer of asphalt coating 26. Alternatively, base mat 20, 40 may have a layer of asphaltic material coated on the exposed side 22, 42 and may further have a layer of asphaltic material applied to the unexposed side 24, 44 wherein a portion of the asphalt coating layer(s) may penetrate or otherwise be adhered to the surfaces of base mat 20, 40. Asphalt coating 26 may be any asphaltic material formulation now known used to cover asphalt shingles, including asphalt modified with any known additives or performance altering admixtures. Asphalt coating 26 may include aggregate filler added to the asphaltic material and mixed therein to promote adhesion and to increase the creep resistance of the mixture under elevated temperatures experienced on a roof.

Granular material (granules) 30 and 50 may be any granular material now used or hereafter used for asphalt shingles that at least (a) cover the top layer asphalt coating 26, (b) provide a weathering surface, (c) shield the top layer asphalt coating 26 from UV light when installed on the roof, and/or (d) contribute to the overall appearance and/or color of an asphalt shingle.

Reinforcing fabric layer 32, 52 may be a polyethylene terephthalate (PET) fabric. Polyethylene terephthalate (PET) is commonly known as polyester. Reinforcing fabric layer 32, 52 may be a fabric, film, paper, parchment, foil or other substrate. Further, in one embodiment, reinforcing fabric layer 32, 52 may have a thickness between about 8 and 24 mils (0.2 to 0.61 mm). However, any other thickness is within the scope of the present invention. In one embodiment, the reinforcing fabric layer 32, 52 will have a weight between 55 and 95 grams per square meter (gsm); however, other fabric weights are also within the scope of the present invention.

In addition, reinforcing fabric layer 32, 52 may include strands of material that are purposely randomly arranged and then are "point bonded" (embossed or pressed at varying intervals) which fuses the strands together for increased strength or chemically bonded, for example with a resin binder. Alternatively, reinforcing fabric layer 32, 52 may be a woven or unwoven fabric as known in the art. In other embodiments, reinforcing fabric layer 32, 52 may include a fabric, film, or other substrate which may or may not have a polymer base. Additional materials from which reinforcing fabric layer 32, 52 may include: polyester fibers, wood pulp, glass fibers, cotton fibers, wool fibers, carpet material, nylon fibers, rayon fibers, acrylic fibers, polyolefin fibers, polypropylene fibers and recycled plastics fibers, recycled paper, binders, and any mixtures thereof. Reinforcing fabric layer 32, 52 may be woven or unwoven. Reinforcing fabric layer 32, 52 may be a film of polyester, polypropylene, polyethylene, acrylics, other known polymer-based films, and other known non-polymer-based films.

In some embodiments, the reinforcing fabric 32, 52 may be a continuous polymer fiber (polyester) or a mineral fiber thread (fiberglass) to create the fabric/web. The continuous fiber feature of the viscoelastic polyester material fabric creates strength and elongation characteristics which are substantially different in behavior and performance than any known fabric, scrim or mat of staple fibers.

The embodiments of the present shingle described above may be made using at least the following method. In one embodiment, mat 20, 40 may be saturated with asphaltic material by submerging mat 20, 40 in asphaltic material or coating mat 20, 40 with asphaltic material as known in the art. Next, the asphalt coating layers 26, 28, 46, 48 may be applied to the saturated mat 20, 40 at the same time or separately. Alternatively, the asphalt coating layer may be applied simultaneously with the saturating step above. The exposed granular material (granules) 30, 50 may then be applied to the top asphalt coating layer 26 opposite the mat 20, 40 using one of the many known processes in the art at any time in the manufacturing process or other similar process developed in the future.

The reinforcing fabric layer 32, 52 may be applied to the unexposed side 24, 44 of mat 20, 40 (respectively) directly to the bottom asphalt coating layers 28, 48 opposite the mat 20, 40. In another embodiment, an asphalt-based adhesive may be used. The reinforcing fabric 32, 52 may be pressed onto the unexposed side of bottom asphalt layers 28 and 48 of the shingle after the granules have been applied to secure the reinforcing fabric to the shingle. At this point in the manufacturing process, the temperature of the asphalt coating on the back of the shingle is much lower than the melting point of the fabric and, therefore, no melting of the fabric occurs. The asphalt, however, is still tacky, thereby adhering the reinforcing fabric layer 32, 52 to the underside of the mat 20, 40. Moreover, the reinforcing fabric may have its performance or properties modified and/or improved through a manufacturing process that applies several bonding steps to bond the fabric, and which may be unique to both strength and elasticity including the fiber orientation, needle punching both top and bottom orientations, high needle stitch rate, the order of bonding steps, the level of heat applied at various steps in the bonding process, and amount/variation of nip pressure applied at calendar rolls.

FIG. 4 shows another embodiment of the present invention showing impact resistant shingle 100 being a laminated shingle that includes a laminated shingle upper (overlay) layer 112 includes an overlay width 116 and an overlay length 118, wherein width 116 and length 118 comprise an area of the shingle 10. In one embodiment width 116 is around one (1) foot one and one-fourth (¼) inches plus or minus one-sixteenth (1/16) of an inch and length 118 is around thirty nine (39) and three-eighths (⅜) inches, plus or minus one-eighth ⅛ inch. Overlay layer 112 also generally includes an exposed side 122 and plurality of architectural cut-outs 134 when combined with surface granules 130 to provide an architectural appearance and texture of the shingle 100.

FIG. 4 also illustrates underlay layer 114 having an exposed side 142 having granules 150 that are visible through the architectural cut-outs 134. The shingle of FIG. 4 also includes a headlap portion 15 and a tab portion 13 as shown in FIG. 1. When installed, the tab portion 13 is visible and the headlap portion 15 is generally covered by the tab portion 13 of an overlapping shingle.

FIG. 4 illustrates that shingle 110 includes a release tape 170 on near the top 172 of headlap portion 15. In one embodiment, release tape 170 may be a distance D1 from the top 172 of shingle 100 and a release tape width WT. In one embodiment, distance D1 may be around seven-sixteenths (7/16) of an inch plus or minus one-quarter (1/4) inch and release tape width WT may be a minimum of seven-eighths (7/8) of an inch. In this embodiment, the nail line directs installers where to nail through the shingle for optimum performance. In addition, a nail line 174 may be printed continuously or dashed on the exposed side 122 as shown, and in one embodiment, the nail line 174 may be a distance D2 about six and one-eighth (6 1/8) inches from a bottom 176 of shingle 100. As will be appreciated by a person of skill in the art, other distances are also within the scope of the present invention.

FIG. 4 shows a stripe of sand 178 disposed on the exposed side 122 of overlay layer 112 near the mid-height of shingle 100. Stripe of sand 178 generally runs across the entire length 118 of shingle 100 and is located along the width 116 such that the stripe of sand 178 will be covered when an overlapping shingle is installed over the headlap portion 15. In one embodiment, a bottom edge 180 of the sand stripe may be around six and five-eighths (6 5/8) inches from bottom 176 and have a stripe width WS of around one and three-quarters (1 3/4) inches, plus or minus a quarter (1/4) inch in a direction toward the top 17. In one embodiment, the sand layer is a very fine aggregate such that when the sand layer 178 is applied, it coats the asphalt coating layer. In one embodiment, the stripe of sand 178 is applied prior to granules 130 and prevents granules 130 from adhering to the top asphalt coating layer so that the overlay layer 112 at the sand layer 178 has an overall thickness that is less than the overall thickness of the overlay layer 112 where the surface granules 130 are applied.

FIG. 5 shows the unexposed side 124 of overlay layer 112 and underlay layer 114 having an unexposed side 144. In one embodiment, a top edge 184 of underlay layer 114 may be a distance D3 from bottom 176 of around six (6) inches. As will be appreciated by a person of skill in the art, other distances are also within the scope of the present invention. FIG. 5 shows that the PET fabric reinforcing layer 132, 152 is applied over the entire area of the unexposed portions of shingle 100 as described above and shown in FIG. 2. Further, FIG. 5 illustrates shingle 100 including sealant bead 156 across the length 118 of shingle 100 proximate bottom 176. In one embodiment, a center of the sealant bead 156 is positioned on the shingle 100 a bead distance DB of around three quarters (3/4) of an inch from the bottom edge 180.

FIG. 6 is a sectional view of the shingle 100 of FIG. 4 cut along the line 6-6. FIG. 6 illustrates the layered construction of shingle 10. As shown, overlay layer 112 includes a base mat 120 and an exposed side 122 and an unexposed side 124. Overlay layer 112 also includes a top asphalt coating layer 126 applied to the exposed side 122 of base mat 120 and a bottom asphalt coating layer 128 applied to the unexposed side 124 of base mat 120. Overlay layer 112 includes a layer of granules 130 that comprises a wearing surface on exposed side 122 and a reinforcing fabric layer 132 that covers bottom asphalt layer 128 and extends over the entire area of underlay layer 114. In one embodiment, the reinforcing layer 132 has a substantially constant or uniform thickness and because the reinforcing layer 132 is applied to the entire area of both the overlay layer 112, the construction of shingle 100 results in a uniform thickness of both the overlay layer 112 and the reinforcing layer 132.

Similarly, underlay layer 114 includes a base mat 140 having an exposed side 142 and an unexposed side 144. Underlay layer 114 also includes a top asphalt coating layer 146 applied to the exposed side 142 of base mat 140 and a bottom asphalt coating layer 148 applied to the unexposed side 144 of base mat 140. Underlay layer 114 also includes a layer of granules 150 applied to the top asphalt layer 146 opposite the mat 140. The layer of granules 150 comprise a wearing surface on exposed side 142. Further, a reinforcing fabric layer 152 is applied to bottom asphalt coating layer 148 opposite mat 140, wherein the reinforcing fabric layer 152 covers the entire area of underlay layer 114. When manufacturing the present shingle, in one embodiment, sand, talc, or any other fine aggregate material is not applied to the bottom asphalt coating layer 148. In its place, the reinforcing fabric layer 152 may be adhered to the bottom asphalt coating layer 48 directly or using an adhesive, where such adhesive may be asphalt based.

As further shown in FIG. 6, sand layer 178 creates a recessed area 182 of exposed side 122 of overlay layer 112. The recessed area 182 of overlay layer 112 may also be referred to herein as a headlap displacement zone. This recessed area 182 is positioned along the width 16 such that recessed area 182 aligns with the end of the overlap of the overlay layer 112 and the underlay layer 114 when a plurality of shingles 100 are stacked in a bundle for transport and/or storage. The recessed area 182 in plurality in a stack acts to eliminate a hump that is present in stacks of laminated shingles. The elimination of a bump or hump is important in that it reduces distortion or deformation of the shingle during storage and/or transport. This distortion and deformation of the shingle causes issues by causing a wavy or rolling appearance of the installed shingles and may reduce functionality and longevity. As such, the use of sand layer 178 to create a recessed area 182 of the overlay layer 112 to prevent humping and distortion of shingles when in a stacked arrangement for storage and transport improves both the appearance of the installed shingles on the roof and the functional performance.

In one embodiment of the present impact resistant shingle 100, any of the above described elements may be included in a commercial embodiment of the present impact resistant shingle. In all of the above embodiments, the shingle sheet may be fed through one or more rollers to compress all of the applied layers to improve the adhesion of each of the layers. The above shingle embodiments may also be manufactured substantially on existing manufacturing lines slightly modified to apply the fabric reinforcing layer 32, 52.

In all of the above embodiments, the larger sheet may be cut lengthwise, with the architectural cut-outs 34 being cut from the overlay layer 12, and then the underlay layer 14 may be aligned under the tab portion 13 of the overlay layer 12. Next, the overlay layer 12 and underlay layer 14 are laminated together using a laminating adhesive 54, wherein the shingles are cut to length, stacked and wrapped for distribution.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

We claim:

1. An impact resistant roofing shingle comprising:
   an upper shingle layer having a tab portion and a headlap portion;

a lower shingle layer laminated to said upper shingle layer underneath said tab portion of said upper shingle layer;
the upper shingle layer and the lower shingle layer comprise:
a mat,
an upper asphalt coating layer applied to an exposed side of the mat,
a lower asphalt coating layer applied to an unexposed side of the mat,
a granular coating applied to the upper asphalt coating layer opposite the mat, and
a fabric reinforcing layer applied to the lower asphalt coating layer opposite the mat;
wherein the upper shingle layer has a width defined between a bottom of the roofing shingle and a top of the roofing shingle, and the lower shingle layer has a width defined between the bottom of the roofing shingle and a top edge of the lower shingle layer;
wherein the fabric reinforcing layer of the upper shingle layer extends the width of the upper shingle layer, and the fabric reinforcing layer of the lower shingle layer extends the width of the lower shingle layer; and
wherein each fabric reinforcing layer comprises a plurality of randomly arranged material strands that are fused together at a plurality of locations.

2. The impact resistant roofing shingle of claim 1, wherein the fabric reinforcing layer of each of the upper shingle layer and the lower shingle layer covers an entirety of an area of the unexposed side of the mat of each of the upper shingle layer and the lower shingle layer.

3. The impact resistant roofing shingle of claim 1, further comprising a nail line visible on a visible surface of the exposed side of the roofing shingle, wherein said nail line is disposed a first distance from a bottom of the roofing shingle, and wherein a top edge of said lower shingle layer is a second distance from the bottom of the roofing shingle, and said first distance is greater than said second distance.

4. The impact resistant roofing shingle of claim 1, wherein the material strands of fabric reinforcing layer comprise polyethylene terephthalate (PET).

5. The impact resistant roofing shingle of claim 1, wherein each fabric reinforcing layer has a thickness between about 8 and 24 mils.

6. The impact resistant roofing shingle of claim 1, wherein each fabric reinforcing layer has a weight between 55 and 95 grams per square meter.

7. The impact resistant roofing shingle of claim 1, further comprising a recessed area of the exposed side of the upper shingle layer, wherein the recessed area is disposed along a width of the roofing shingle such that the recessed area aligns with an overlap of the upper shingle layer and the lower shingle layer when a plurality of the roofing shingle are stacked on top of each other in a bundle for transport and/or storage.

8. The impact resistant roofing shingle of claim 1, wherein each fabric reinforcing layer is adhered to the shingle by the lower asphalt coating layer.

9. The impace resistant roofing shingle of claim 1, wherein the upper shingle layer and the lower shingle layer are each a uniform thickness.

10. An impact resistant roofing shingle comprising:
an upper shingle layer having a tab portion and a headlap portion, wherein the upper shingle layer comprises a first mat, a first upper asphalt coating layer applied to an exposed side of the first mat, a first lower asphalt coating layer applied to an unexposed side of the first mat, a first granular coating applied to the first upper asphalt coating layer opposite the first mat, and a first fabric reinforcing layer adhered to the lower asphalt coating layer opposite the first mat, wherein the first fabric reinforcing layer covers an entirety of an area of the unexposed side of the first mat; and
a lower shingle layer laminated to said upper shingle layer underneath said tab portion of said upper shingle layer, wherein the lower shingle layer comprises a second mat, a second upper asphalt coating layer applied to an exposed side of the second mat, a second lower asphalt coating layer applied to an unexposed side of the second mat, a second granular coating applied to the second upper asphalt coating layer opposite the second mat, and a second fabric reinforcing layer adhered to the lower asphalt coating layer opposite the second mat, wherein the second fabric reinforcing layer covers an entirety of an area of the unexposed side of the second mat; and
wherein the upper shingle layer has a first width defined between a bottom of the roofing shingle and a top of the roofing shingle, and the lower shingle layer has a second width defined between the bottom of the roofing shingle and a top edge of the lower shingle layer, wherein the second width is less than the first width of the overlay layer;
wherein the first fabric reinforcing layer extends the width of the upper shingle layer, and the second fabric reinforcing layer extends the width of the lower shingle layer; and
wherein the first and second fabric reinforcing layers each comprise a plurality of randomly arranged material strands that are fused together at a plurality of locations.

11. The impact resistant roofing shingle of claim 10, further comprising a nail line visible on a visible surface of the exposed side of the upper shingle layer, wherein said nail line is located a first distance from a bottom of the roofing shingle, and the lower shingle layer having a top edge, wherein the top edge of said lower shingle layer is a second distance from the bottom of the roofing shingle, and said first distance is greater than said second distance.

12. The impact resistant roofing shingle of claim 10, wherein the first and second fabric reinforcing layers are adhered to the roofing shingle by the first and second lower asphalt coating layer, respectively.

13. The impact resistant roofing shingle of claim 10, further comprising a recessed area of the exposed side of the upper shingle layer, wherein the recessed area is disposed along a width of the roofing shingle such that the recessed area aligns with an overlap of the upper shingle layer and the lower shingle layer when a plurality of the roofing shingle are stacked on top of each other in a bundle for transport and/or storage.

14. The impact resistant roofing shingle of claim 10, wherein the first and second fabric reinforcing layers have a first and second thickness, respectively, between about 8 and 24 mils.

15. The impact resistant roofing shingle of claim 10, wherein the first and second fabric reinforcing layers have a first and second weight, respectively between 55 and 95 grams per square meter.

16. The impace resistant roofing shingle of claim 10, wherein the upper shingle layer and lower shingle layer are each a uniform thickness.

17. An impact resistant roofing shingle comprising:
an upper shingle layer having a tab portion and a headlap portion;

a lower shingle layer laminated to said upper shingle layer underneath said tab portion of said upper shingle layer;

the upper shingle layer and the lower shingle layer each comprise:
- a mat;
- an upper asphalt coating layer applied to an exposed side of the mat,
- a lower asphalt coating layer applied to an unexposed side of the mat,
- a granular coating applied to the upper asphalt coating layer opposite the mat, and
- a fabric reinforcing layer applied to the lower asphalt coating layer opposite the mat;

wherein the upper shingle layer and the lower shingle layer are each a uniform thiickness, and wherein each fabric reinforcing layer comprises a plurality of randomly arranged material strands that are fused together at a plurality of locations.

\* \* \* \* \*